UNITED STATES PATENT OFFICE.

ARTHUR J. MOXHAM, OF NEW YORK, N. Y.

PROCESS OF EXTRACTING IRON FROM ITS ORES.

1,420,128.  Specification of Letters Patent.  Patented June 20, 1922.

No Drawing.  Application filed April 5, 1919.  Serial No. 287,361.

*To all whom it may concern:*

Be it known that I, ARTHUR J. MOXHAM, a subject of the King of Great Britain, residing at New York city, county of New York, and State of New York, have invented a new and useful Improvement in Processes of Extracting Iron from Its Ores, of which the following is a full, clear, and exact description.

With a suitable electrolyte it is possible to use an anode consisting of iron ore or of many other kinds of ore, suspended or contained in a grid or basket, in conjunction with a cathode of the metal, with the usual result of a deposit of the metal on the cathode when electrolyzed. But it is found that the impurities in the ore become disturbing elements, which lead to the use of excessive current, and that, because the impurities increase pro rata as the process continues, they may finally become so potent as to much retard the process. Even when the metallic contents of the ore are reduced to the metallic condition by extraneous means (for example, passing it through a heat zone with reducing gas), in order to reduce the amount of current needed, unless the ore is well purified by concentration, the final result is the same. In this case, at the beginning, the reduced ore offers a facile path to the current; but as the iron goes into solution and then into redeposit on the cathode, the impurities remaining behind constitute a relatively continually growing mass, and become an impediment to the process. One important reason is that as the metallic contents of the ore become dissolved at the anode and deposited at the cathode, the equilibrium of the mass is disturbed due to the dissolving out of the iron and the mass drops down at the anode into the liquid. As this mass increases it is apt to spread until it reaches the cathode. Although at this stage, a very small amount of undissolved metal will be left in the ore, enough remains to establish a short circuit and so interfere with the uniformity of the process by calling for an increase in voltage to maintain the pre-existing electric current condition. The result is to seriously slow down the speed of reaction.

The object of my invention is to eliminate the conditions which lead to the deterioration of the electrolyte. This object is attained by separating from the ore the iron in a solution, by purifying the solution by removing ingredients whose accumulation would lead to the use of increased current in the process of electrolyzing, or would interfere with the purity of the finished product, and by preventing the metallic iron that separates in the electrolytic treatment from re-combining with the acid that forms as the iron separates. My process is further characterized by the fact that almost none of the ingredients that are used in the process is wasted, all being either re-utilized in the process, or used to form readily merchantable compounds.

I first treat the ore with a sufficient quantity of acid to dissolve the metallic ingredients of the ore. Much of the economy depends upon the proper selection of the most suitable acid. Some acids will dissolve the metallic ingredients more quickly and perfectly than others. Preferably, in dissolving iron ore, I use hydrochloric acid, which dissolves out the metal with great efficiency and speed and with a clean product resulting. I do not, however, limit myself to the use of hydrochloric acid. Thus, sulfuric acid is a practicable solvent, although its action is relatively slow.

After the metal is thus dissolved, I first separate the metallic contents, now in solution, from the insoluble gangue by draining off the solution. In view of the fact that the presence of material foreign to those which are desired in the electrolyte is almost always a disturbing element and generally calls for additional current during the electrolysis, as already described, this draining off is of importance. Moreover, the solution made is one that is soluble in water, and, in the case of an iron ore, preferably ferric chloride or ferric sulfate.

Any liquid in contact with a solid adheres so tenaciously to the solid that even by long continued draining it cannot be removed very thoroughly. After many hours draining, there will be as much as from 8 to 10 per cent adhering; and even after passing through an effective centrifuge, the amount of solution adhering to the material cannot be reduced to much, if any, below 4 per cent. In the case of the residue, therefore, it becomes necessary, or at least advantageous and economical, to effect a replacement of the iron solution that is still adhering to the residue by some cheaper liquid. This can be done by using water, as the solution is soluble in water. Replacement or dilution is resorted to, preferably while agitating either the ore, or the water, or both. By this means the iron solution held by the residue is so diluted by its replacement with the water that the loss or waste will be reduced to only a few pounds per ton of residue. The amount, and therefore cost, of this waste of solution determines largely how low a grade of ore can be worked, because the amount of the solution carried out and wasted with the insoluble residue is a more or less constant factor of the volume of the gangue and the gangue increases in relative quantity as the ore becomes lower in metallic contents.

If hydrochloric acid is used to dissolve the iron, a still greater economy can be effected if desired by treating the residue with a concentrated sulfuric acid. This will drive off the hydrochloric acid in that part of the solution still adhering to the residue, and the hydrochloric acid, set free as a gas, can be absorbed in water or other material for future use. The iron present will be converted into ferric sulfate, which is extremely soluble when hydrated in water. The solution of either the chloride or sulfate which is thus diluted by water is saved and used later in forming the bath for the electrolyte, where it will give up its valuable ingredients on being electrolyzed. In this case, while the amount of material left on the residue is no greater than when the chloride is treated directly, it now consists of sulfate of iron, which is cheaper than the chloride of iron, and so the value of the material lost is reduced.

Furthermore, when separating materials by heavy gravity liquids, the loss from adhesion of the liquid to the material is applicable to both the metallic portion, or concentrates, and to the residue. By getting the metallic ingredients into solution, the loss by adhesion, whatever it may be, is applicable to the residue only, and therefore cannot be much over half of what it would be in the separation by heavy gravity liquids.

It is known, in producing metallic iron, by electrolysis, from iron ore, that such ore, used, without previous preparation, for an anode, has not been successful. It contains from 16% to 40% insoluble gangue and, say, perhaps, 8% of ingredients other than iron, and the impurities interfere with the electrolyzing. Neither has the use of pig metal been found successful, as pig iron contains from 6 to 10% of impurities other than iron. A large part of these impurities consists of carbon, which gives trouble as it accumulates in the electrolyte. This accumulation may take place in at least two ways: First, by dropping off the electrode in the form of grains of carbon, which, if not watched, collect between the anode and cathode, or drop to the bottom of the cell in such a manner that they short circuit the cell; and, second, by going into the solution as very finely divided, or colloidal, carbon, in which condition it is liable to be deposited as an impurity in the cathodic metal, or to be acted upon by the current in such a manner as to form hydrocarbons.

As the material is now in form of a solution, it can be further purified cheaply by precipitating any of the undesired ingredients, and the solution thereby is made as pure as may be desired. As none of the reagents or acids need be lost or wasted, it will be economical, in many cases, to even purify pig metal and use the same by dissolving the metallic contents in acid.

However, while the use of an acid for the solution of the metallic ingredients of an ore leads to a greater efficiency and more perfect separation of the gangue from the metallic constituents, the acid must not be permanently consumed in the process. It must be so treated that it can be reclaimed for use over again or that its value can be won back. Failure to do this would make its cost prohibitive in many cases and therefore would much limit the scope of the process, as it generally takes a considerable relative weight of acid to dissolve the metallic contents of an ore.

By the process herein described I depend upon the principle of replacement. That is, as each step progresses, I use a cheaper reagent to replace one that is more expensive; so that the greatest economy is secured where waste must be incurred, and at the same time the greatest or most advantageous value is secured where the material used becomes available to be sold or otherwise disposed of.

After the solution is purified, as above explained, it consists principally (assuming the use of hydrochloric acid as a dissolving agent) of ferric chloride containing a small amount of other chlorides and a few sulfates. It is conducted, after being neutralized, to any suitable storage receptacle, and from this it is delivered to an electrolytic chamber or cell. It is there added to the proper ingredients to make the suitable electrolyte and subjected to electrolysis by the usual method. An insoluble anode is used, preferably of carbon, together with an iron cathode. As a result, chemically pure iron will be deposited on the cathode, the ferric chloride being first reduced to ferrous chloride.

When, however, the iron is deposited on the cathode, it sets free a molecular equivalent of hydrochloric gas (HCl) and such gas will generally go into solution with the water of the electrolyte, forming in the same free hydrochloric acid. Unless special provision is made to meet this condition, the free acid will either in whole or in part redissolve the iron as it is deposited on the cathode, and thus nullify the action of the current. I meet this condition by providing a proper base to combine with the free acid as it is formed, which base will either make the salt produced a salable salt or one that can be used over again in the process. To illustrate the difference as to salability, either sodium or ammonia would answer for the base, so far as concerns neutralizing the free acid and permitting the deposit to continue. But the use of sodium is inadvisable, because it would form a salt that would be of relatively little value, while the ammonium salt would be of value and readily marketable, either as such, or after conversion into another salt, as hereinafter explained.

Such a base should be preferably introduced in admixture as a salt, preferably as a combination of a base with one of the weak or non-active acids. For example, I may use oxalate, acetate, citrate, or tartrate of ammonium, because the acids in these salts, being more or less non-active, readily yield to replacement by many other stronger acids, and being weak, their action on the iron of the cathode is negligible when they are set free. Therefore, with the use of a base (such as ammonia) combined with any of these non-active acids, the more active hydrochloric acid will seize and combine with the ammonium base and in turn set free the corresponding weaker or more passive acid that has been used in making the salt. Such weak acids as those which result will not neutralize or block the action of the current by dissolving the metal as fast as it is deposited; and therefore the electrolytic deposition of the iron will continue.

After the iron is deposited, there will remain in the electrolyte ammonium chloride and the weak free acid. I separate the two from each other, or from the electrolyte, if necessary, by evaporation and crystallization. The separation can be easily carried out, because there exists sufficient difference in the solubility of ammonium chloride and the weak acids to make the separation completely effective.

While I prefer adding the base ammonia as a salt, in the manner described, it is nevertheless possible to add the base in the form of ammoniacal liquor, or even as a gas; adjusting the amount delivered to suit the reaction which sets free the acid. In this case the non-active acid is not present at the end of the operation.

To the ammonium chloride now separated by crystallization, I add sulfuric acid. This being stronger than the hydrochloric acid, replaces the same and energetically sets free the gaseous hydrochloric acid (HCl), which may be absorbed in water, and is available for re-use in dissolving the metallic constituents of fresh ore. It can also be used in its gaseous form, to concentrate the ferric chloride solution, as hereinafter described. The sulfuric acid combines with the ammonia that is set free by the reaction, forming ammonium sulfate, which can also be obtained in crystal form by evaporation. The ammonium sulfate has a large and profitable market.

Because of the need of this evaporation, it is of importance that the electrolyte should have no more water added to it than the minimum amount that is demanded by electrolytic consideration, this in turn leading to the minimum amount of evaporation to secure the crystals. It is therefore advantageous to concentrate the ferric chloride solution as much as possible. This can be done as follows. When the process is started, commercial hydrochloric acid in used for the dissolution of the ore. As this acid does not exceed 40 per cent strength, it results that when the dissolution of the ore is carried to the point of neutrality, or nearly thereto, it will contain a considerable quantity of water. At this stage the hydrochloric acid which is being recovered for further use, in the reaction which develops the ammonium sulfate at the end of the process, as above described, is passed while in gaseous form through the solution of ferric chloride, and at the same time a further quantity of ore is added to this solution. Under these conditions the water, with its absorbed hydrochloric gas, will dissolve a further amount of iron. So long as the passage of the acid is continued, the acid will tend to go on dissolving the iron, while, on the other hand, the dissolving of the iron will tend to neutralize the acid, and so the process will be continuous. It will continue until a considerable degree of concentration is reached and the percentage of water is thereby proportionately reduced.

If preferred, by the addition of sulfuric acid, gaseous hydrochloric acid can be driven off and reclaimed and the iron chloride converted into iron sulfate before electrolyzing the solution. As the result of the electrolysis of this solution, sulfuric acid is set free, and combines with the base ammonia in the same way as was explained for the hydrochloric acid, forming, in this case also, ammonium sulfate.

In the execution of the entire process, as above described, it will be observed that certain materials have been utilized in the process and that certain materials have been obtained for sale, or for re-use, without substantial waste and without conversion from a more valuable to a less valuable condition. Thus, there have been furnished: (1) iron in the shape of ore; (2) hydrochloric acid;

(3) either the ammonium salt or the ammoniacal liquor; (4) sulfuric acid. There have been obtained: (1) chemically pure iron; (2) ammonium sulfate. There remain available for re-use: (1) all the hydrochloric acid; (2) all the weak acid, if such has been used. In other words, after the metallic ingredients are separated and purified, the hydrochloric acid and the weak acid, if used, are reclaimed, and the salt in the electrolyte is converted from a disadvantageous condition to a condition in which it is readily salable. There should be practically no waste of material in the whole process, while there is a gain in value.

I have not herein specifically claimed driving off and reclaiming the hydrochloric acid and converting the ferric chloride into a sulfate by the addition of sulfuric acid before electrolyzing the solution, thus forming ferrous sulfate; this variation of the process forming the subject-matter of a separate application.

Having now fully described my invention, what I claim and desire to protect by Letters Patent is:

1. The process of extracting iron from an iron solution which comprises subjecting the same to electrolysis to effect the separation of the iron, and causing the acid set free by such separation to combine with a base other than the iron, thereby neutralizing the same and preventing the re-dissolution of the iron.

2. The process of extracting iron from an iron salt which comprises subjecting the same to electrolysis to effect the separation of the iron, and adding to the electrolyte a salt formed of a base combined with an acid relatively inactive with iron and adapted to be displaced by the acid set free during the separation of the iron to neutralize the latter acid, and separating from the displaced acid the salt thus formed.

3. The process of extracting iron from an iron salt which comprises subjecting the same to electrolysis to effect the separation of the iron, adding to the electrolyte a salt formed of a base combined with an acid relatively inactive with iron and adapted to be displaced by the acid set free during the separation of the iron from its salt to neutralize the latter acid, separating the new salt thus formed in the electrolyte from the displaced acid by crystallization, displacing the acid of the last named salt by another acid to form another salt, and re-using in the process the acid displaced in the preceding step.

4. The process of extracting iron from its ore which comprises dissolving the iron with hydrochloric acid, separating out the iron in metallic form by electrolysis in which the iron chloride is utilized in the electrolytic bath, and combining a base with the hydrochloric acid set free during the deposition of iron to neutralize the hydrochloric acid.

5. The process of extracting iron from its ore which comprises dissolving the iron with an acid, separating out the iron in metallic form by electrolysis in which the iron solution is utilized in the electrolytic bath, adding to the electrolyte a salt formed of a base combined with an acid relatively inactive with iron and adapted to be displaced by the first-named acid to form another salt and neutralize the acid set free during the deposition of the iron, and separating from the displaced acid the salt thus formed.

6. The process of extracting iron from its ore which comprises dissolving the iron with hydrochloric acid, separating out the iron in metallic form by electrolysis in which the iron solution is utilized in the electrolytic bath, adding to the electrolyte a salt formed of a base combined with an acid relatively inactive with iron and which acid is adapted to be displaced by hydrochloric acid to form another salt and neutralize the hydrochloric acid set free during the deposition of the iron, separating such salt from the displaced acid, and treating the same with sulfuric acid to form a sulfate of said base.

7. The process of extracting iron from its ore which comprises dissolving the iron with hydrochloric acid, separating out the iron in metallic form by electrolysis in which the iron solution is utilized in the electrolytic bath, adding to the electrolyte a salt formed of a base combined with an acid relatively inactive with iron and which acid is adapted to be displaced by hydrochloric acid thus forming another salt and neutralize the hydrochloric acid set free during the deposition of the iron, separating such product from the displaced acid, treating it with sulfuric acid to form still another salt, and re-utilizing in the process the gaseous hydrochloric acid driven off.

8. The process of extracting iron from its ore which comprises dissolving the iron with hydrochloric acid, separating the iron in metallic form from the solution by electrolysis in which the iron solution is utilized in the electrolyte, and adding ammonia to the same, thereby causing the hydrochloric acid set free, during the deposition of the metallic iron, to be neutralized by combining with the ammonia to form ammonium chloride.

9. The process of extracting iron from its ore which comprises dissolving the iron with hydrochloric acid, separating the iron in metallic form by electrolysis in which the iron solution is added to the electrolyte together with a salt composed of ammonia and an acid relatively inactive with iron thereby causing the hydrochloric acid, set free during the deposition of the metallic iron, to be neutralized by combining with the ammonia to form ammonium chloride, and separating the ammonium chloride by crystallization.

10. The process of extracting iron from its ore which comprises dissolving the iron with hydrochloric acid, separating the iron in metallic form by electrolysis in which the iron solution is utilized in the electrolyte, adding ammonia to the same, thereby causing the hydrochloric acid set free, during the deposition of the metallic iron, to be neutralized by combining with the ammonia to form ammonium chloride, and treating the ammonium chloride with sulfuric acid, thus setting free hydrochloric acid and forming ammonium sulfate.

11. The process of extracting iron from its ore which comprises dissolving the iron with an acid, separating the iron from the solution by electrolysis, and recovering the acid set free during electrolysis and utilizing the same in the treatment of fresh quantities of ore.

12. The process of extracting iron from its ore which comprises dissolving the iron with an acid and then adding to the solution fresh quantities of ore and passing into the solution fresh quantities of the same acid in gaseous form.

13. The process of extracting iron from its ore which comprises dissolving the iron with hydrochloric acid and then adding to the solution fresh quantities of ore and passing into the solution gaseous hydrochloric acid.

14. The process of extracting iron from its ore which comprises dissolving the iron with hydrochloric acid, separating the iron from the solution by electrolysis, forming a chloride by combining with a base and neutralizing the hydrochloric acid set free during electrolysis, treating the chloride with sulfuric acid to form a sulfate, thereby setting free hydrochloric acid gas, and utilizing said gas to concentrate fresh quantities of iron chloride.

In testimony of which invention, I have hereunto set my hand, at New York city, N. Y., on this 3rd day of April, 1919.

ARTHUR J. MOXHAM.